US012811541B2

(12) United States Patent
McPheeters et al.

(10) Patent No.: US 12,811,541 B2
(45) Date of Patent: Nov. 24, 2026

(54) BEARING ADAPTERS FOR SINGLE-AXIS TRACKERS

(71) Applicant: Nextpower LLC, Fremont, CA (US)

(72) Inventors: Greg McPheeters, Santa Cruz, CA (US); Charles Almy, Berkeley, CA (US)

(73) Assignee: Nextpower LLC, Fremont, CA (US)

( * ) Notice: Subject to any disclaimer, the term of this patent is extended or adjusted under 35 U.S.C. 154(b) by 262 days.

(21) Appl. No.: 18/401,959

(22) Filed: Jan. 2, 2024

(65) Prior Publication Data

US 2024/0136971 A1 Apr. 25, 2024

Related U.S. Application Data

(63) Continuation-in-part of application No. 16/810,012, filed on Mar. 5, 2020, now Pat. No. 12,584,516.

(60) Provisional application No. 62/875,924, filed on Jul. 18, 2019, provisional application No. 62/814,789, filed on Mar. 6, 2019.

(51) Int. Cl.

| | |
|---|---|
| ***H02S 20/32*** | (2014.01) |
| ***E02D 5/80*** | (2006.01) |
| *F24S 30/00* | (2018.01) |

(52) U.S. Cl.

CPC .............. *H02S 20/32* (2014.12); *E02D 5/801* (2013.01); *F24S 2030/15* (2018.05)

(58) Field of Classification Search

CPC ........ Y02E 10/47; Y02E 10/50; F24S 30/425; F24S 25/617; F24S 2030/15

See application file for complete search history.

(56) References Cited

U.S. PATENT DOCUMENTS

| | | | |
|---|---|---|---|
| 587,695 | A | 8/1897 | Billing et al. |
| 4,832,001 | A | 5/1989 | Baer |
| 5,228,924 | A | 7/1993 | Barker et al. |
| 5,584,311 | A | 12/1996 | Schaefer |
| 7,484,772 | B2 | 2/2009 | Thorensen |
| 7,485,059 | B2 | 2/2009 | Fadler et al. |
| 8,413,391 | B2 | 4/2013 | Seery et al. |
| 8,578,929 | B2 | 11/2013 | Krabbe et al. |

(Continued)

FOREIGN PATENT DOCUMENTS

| | | | |
|---|---|---|---|
| EP | 1795829 | A2 | 6/2007 |
| KR | 1020160144628 | A | 12/2016 |
| WO | 2013158639 | A1 | 10/2013 |

OTHER PUBLICATIONS

International Search Report PCT/US2020/021178, issued Jun. 19, 2020.

(Continued)

*Primary Examiner* — Brian E Glessner
*Assistant Examiner* — Daniel J Kenny
(74) *Attorney, Agent, or Firm* — Fredrikson & Byron, P.A.

(57) ABSTRACT

Bearing adapters for use with truss foundations supporting mechanically balanced single-axis trackers. The bearing adapter joins the free ends of a pair of adjacent truss legs to form a rigid A-frame shaped foundation structure. A bearing is formed in an upper portion of the bearing adapter to allow a torque tube to be suspended from a pin in the bearing and to swing through an arc bounded by the bearing adapter. The bearing may have a catenoid shape to compensate for misalignment in multiple directions.

8 Claims, 14 Drawing Sheets

(56) References Cited

U.S. PATENT DOCUMENTS

| | | | | |
|---|---|---|---|---|
| 8,609,977 | B2 | 12/2013 | Jones et al. | |
| 9,207,000 | B2 | 12/2015 | Kruse | |
| 9,633,585 | B1 | 4/2017 | Hanes | |
| 10,320,326 | B2 | 6/2019 | Schimelpfenig et al. | |
| 10,788,102 | B2 | 9/2020 | Cisek | |
| 2008/0029148 | A1 | 2/2008 | Thompson | |
| 2011/0163051 | A1 * | 7/2011 | Horanek | F24S 25/13 211/26 |
| 2012/0006317 | A1 | 1/2012 | Sade | |
| 2013/0319402 | A1 | 12/2013 | Shaw | |
| 2013/0340807 | A1 | 12/2013 | Gerwing et al. | |
| 2015/0059826 | A1 | 3/2015 | Reed et al. | |
| 2015/0176280 | A1 | 6/2015 | Brothersen | |
| 2015/0236636 | A1 | 8/2015 | Sade | |
| 2016/0013751 | A1 | 1/2016 | Michotte De Welle et al. | |
| 2016/0329860 | A1 | 11/2016 | Kalus et al. | |
| 2017/0072260 | A1 | 3/2017 | Jackson | |
| 2017/0301814 | A1 | 10/2017 | Au | |
| 2018/0051915 | A1 * | 2/2018 | Rainer | F24S 25/617 |
| 2018/0224161 | A1 | 8/2018 | Au | |

OTHER PUBLICATIONS

International Search Report from PCT/US2020/058021 issued Mar. 8, 2021.

* cited by examiner

BEARING ADAPTERS FOR SINGLE-AXIS TRACKERS

CROSS-REFERENCE TO RELATED APPICATIONS

This is a continuation-in-part of U.S. patent application Ser. No. 16/810,012 filed on Mar. 5, 2020, titled "BEARING ADAPTERS FOR SINGLE-AXIS TRACKERS" which claims priority to U.S. provisional patent application nos. 62/875,924 filed on Jul. 18, 2019, titled "Bearing adapters for single-axis trackers supported by truss foundations," and 62/814,789, filed on Mar. 6, 2019, titled "Bearing housing assemblies and related systems and methods for A-frame foundation supporting mechanically balanced single-axis trackers," the disclosures of which are hereby incorporated by reference in their entirety.

BACKGROUND

Solar energy is one of Earth's largest potential sources of energy. Above the atmosphere, solar irradiance per unit area is 1.361 kilowatts per square meter. At sea level, the usable energy density is reduced to 250 watts per square meter. Using a two-dimensional model to approximate the Earth, 250 watts/square meter*π*6,371,000 meters$^2$ yields about 32,000 terra (trillion) watts of energy that continuously strikes Earth's surface. Assuming the sun continues to burn and emit photons for a billion more years, the survival of human life ultimately depends on harnessing this essentially unlimited, source of clean energy.

The main impediment to widescale solar adoption thus far has been cost. Unlike other energy sources, solar energy costs are frontloaded while the operating costs are comparatively low. Fossil fuel-based energy sources require up-front costs as well as pay-as-you-go costs from consuming fuel. Unfortunately, not all the ongoing costs are reflected in the price of energy generated from fossil-fuel sources. These "dirty" energy sources have significant external costs stemming from $CO_2$ emissions that, in the absence of a carbon tax, are not yet reflected in the cost to consumers. In addition, entrenched utilities and fossil fuel producers have lobbied effectively to stymie the progress of solar, even in states with the greatest solar potential.

Notwithstanding these headwinds, the cost of solar has now dropped low enough that even when coupled with energy storage, it is equivalent to or less expensive than coal, oil and even natural gas. In the context of the electricity market, the relative cost difference between competing sources is quantified in terms of the cost per unit of energy, typically a kilowatt hour (kWh). Large scale solar arrays, so called "utility-scale" arrays, may have tens to hundreds of megawatts of power generating capacity, putting them on the same scale as small coal and natural gas-fired power plants. These arrays usually generate power that is fed into the grid and sold at wholesale prices on the order of a few cents per kWh. The development of utility-scale solar projects is funded with so-called power purchase agreements (PPAs). With a PPA, an off-taker (e.g., utility, grid operator, etc.) agrees to purchase all the power generated by the system at a fixed rate for the operational life of the array (e.g., 30 years). This enables a bank or other investor to accurately value the predicted future stream and to loan money against it to finance construction of the array.

Utility-scale solar power plants are predominantly configured as fixed-tilt ground mounted arrays or single-axis trackers. Fixed-tilt arrays are arranged in East-West oriented rows of panels tilted South at an angle dictated by the latitude of the array site—the further away from the equator, the steeper the tilt angle. By contrast, single-axis trackers are installed in North-South rows with the solar panels attached to a rotating axis called a torque tube that move the panels from an East-facing orientation to a West-facing orientation throughout the course of each day, following the sun's progression through the sky. For purposes of this disclosure, both fixed-tilt and single-axis trackers are referred to collectively as axial solar arrays.

Most single-axis tracker makers use one of two possible configurations for attaching the torque tube to the monopile foundation. The most common attaches the torque tube support element (e.g., bearing housing, bearing housing support, etc.) to the top, flange or sides of a row of standard H-piles. The bearing surrounds the torque tube and the tube rotates inside of it like an axle within a wheel bearing. Monopiles typically have holes or slots formed at one end, in each flange or in the web, so that the torque tube support elements can be easily attached and adjusted in the vertical and in some cases even the horizontal direction to align the torque tube with the other piles and bearing housings in the row. One commercially available system using such bottom-up configuration is the DuraTrack HZ single-axis tracker from ARRAY TECHNOLOGIES, INC. of Albuquerque, NM. In the DuraTrack system, the torque tube rotates directly about its axis within a bearing that sits on top of an H-pile. Many other tracker makers use this same bottom-up design.

Although less commonly employed, at least one tracker maker has successively commercialized a tracker with a top-down configuration where the torque tube hangs by a bracket from hinge pin that allows the entire tube to swing like a pendulum rather than rotating about its own axis. The drive motor is offset from the center of the torque tube to be aligned with the center of rotation of the system which, in this system, is a bearing pin. Known commercially as the NX Horizon single-axis tracker from NEXTRACKER INC. of Fremont, CA, this tracker purports to be mechanically balanced meaning that the amount of torque required to move the torque tube is the same at all panel angles. Bottom-up systems require more torque to resist gravity as the angle of the modules with respect to the ground becomes steeper, but in the balanced system the required torque remains constant and overturning moments are reduced. However, because the torque tube hangs, it swings through an arc rather and therefore, needs clearance in the East-West direction from the structure holding the tube—a constraint not present on bottom-up systems. To accommodate, NEXTracker attaches a pair of right-angle brackets to the outside face of each flanges of the H-pile to provide a horizontal mounting platform with greater width than provided by the H-pile alone. A -upside-down U-shaped bearing housing assembly is then mounted this horizontal platform and the torque tube is hung from a bearing pin seated in a bearing at the center of the upside-down U.

Excluding land acquisitions costs, overall project costs for utility-scale arrays may include site preparation (road building, leveling, grid and water connections etc.), foundations, tracker or fixed-tilt hardware, solar panels, inverters and electrical connections (conduit, wiring, trenching, grid interface, etc.). Many of these costs have come down over the past few years due to ongoing innovation and economies of scale, however, one area that has been largely ignored is foundations. Foundations provide a uniform structural interface that couples the system to the ground. When installing a conventional single-axis tracker, after the site has been prepared, plumb monopiles are usually driven into the ground at regular intervals dictated by the tracker manufacturer and site plan; the tracker system components are subsequently attached to the head of those piles. Most often, the piles used to support the tracker have an H-shaped profile, but they may also be C-shaped or even box-shaped. In conventional, large-scale single-axis tracker arrays, the procurement and construction of the foundations may represent up to 5-10 percent of the total system cost. Despite this relatively small share of the total cost, any savings in steel and labor associated with foundations will amount to a significant amount of money over a large portfolio of solar projects. Also, tracker development deals are often locked-in a year or more before the installation costs are actually incurred, so any post-deal foundation savings that can be realized will be on top of the profits already factored in to calculations that supported the construction of the project.

One reason monopiles continue to dominate the market for single-axis tracker foundations is simplicity. It is relatively easy to drive monopiles into the ground along a straight line with existing technology, however, the design is inherently wasteful. The physics of a monopile mandates that it be oversized because single structural members are not good at resisting bending forces. When used to support a single-axis tracker, the largest forces on the foundation are not from the weight of the components, but rather the combined lateral force of wind striking the solar panels. This lateral force gets translated into the foundation as a bending moment. The magnitude of this force is much greater than the static loading attributable to the weight of the panels and tracker components. It acts like a lever arm trying to bend the pile, and the longer the lever arm, the greater the magnitude of the force. Many tracker companies specify a minimum foundation height of 40-inches or more. Therefore, in the context of single-axis trackers, monopile foundations must be oversized and driven deeply into the ground to withstand lateral loads.

One proposed alternative to monopile foundations is to use a pair of moderately angled legs to form an A-frame or truss-like foundation. Truss foundations have the potential to increase utility-scale solar installations by reducing costs relative to monopiles. One reason for this is that truss foundations translate lateral loads on the tracker into axial forces of tension and compression in the truss legs rather than into bending. Because single structural members are poor at resisting bending relative to their ability to resist axial forces, heavier and thicker steel must be used when supporting a single-axis tracker with monopiles relative to truss foundations. Also, because the legs of the truss are resisting lateral loads mostly with tension and compression in the legs, the legs do not need to be driven as deeply as an equivalent monopile. In addition to saving steel, this reduces the chances of encountering sub-surface rock. The monopile mitigation process for overcoming a refusal due to rock is nearly ten times as expensive as simply beating a monopile into the ground so any reductions in refusals will save project installation costs.

Finally, for some trackers, tracker-to-foundation integration has the potential to further reduce costs relative to H-piles. It is possible for the apex hardware that joins adjacent truss legs to form the A-frame-shaped structure to also make up a portion of the tracker, thereby reducing the overall part count. Specifically, by joining adjacent truss legs with the same component that provides the bearing for the tracker's rotating member (i.e., the torque tube, bearing pin, etc.), the combined tracker and foundation can be made and constructed less expensively. To that end, it is an object of various embodiments of this disclosure to provide a bearing adapters that provide a truss or A-frame foundation for single-axis trackers applications, thereby optimizing the amount of steel and depth of embedment needed for a given diameter leg.

DETAILED DESCRIPTION

The following description is intended to convey a thorough understanding of the embodiments described by providing a number of specific embodiments and details involving truss foundations used to support single-axis solar trackers. It should be appreciated, however, that the present invention is not limited to these specific embodiments and details, which are exemplary only. It is further understood that one possessing ordinary skill in the art in light of known systems and methods, would appreciate the use of the invention for its intended purpose.

Figure 1A:
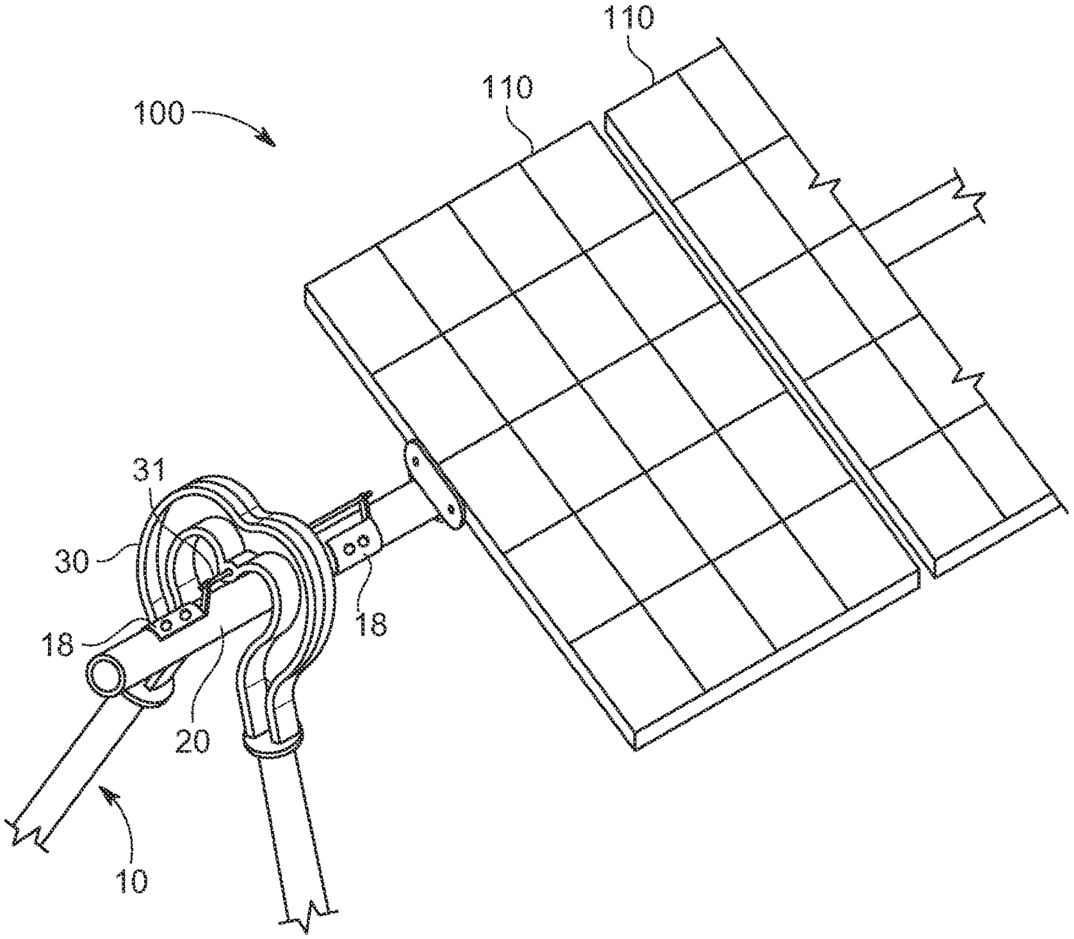
FIG. 1A shows a portion of single-axis tracker supported by a truss foundation according to various exemplary embodiments of the invention.

Turning to FIG. 1A, this figure shows a portion of a single-axis tracker 100 supported by truss foundation 10 according to various exemplary embodiments of the invention. The portion shown includes a partial foundation 10 attached to a bearing adapter 30 that supports a section of suspended torque tube 20. The term "bearing adapter" is used generically herein to refer to structure that performs the function of an adapter and a tracker bearing assembly. That is, it structurally joins the free, aboveground ends of the adjacent truss legs as well as providing a bearing to receive a rotating member that allows the torque tube to move. In the example of FIG. 1, the rotating member is a bearing pin 31 from which the torque tube is rotationally connected. In other embodiments, the rotating member may be the torque tube itself. In such embodiments, the bearing opening will be much larger to accommodate the torque tube, and the bearing adapter need not be as wide or tall because the torque tube rotates in place rather than swinging like a pendulum about the bearing.

The legs of the foundation have been cut-off to focus on the elements that are the subject of the present disclosure. In this example, torque tube 20 is suspended from hinge pin 31 passing through bearing adapter 30 via hinge brackets 18. Several PV modules 110 are attached to the section of torque tube 20 via C-clamp brackets joining the frame of each module to the torque tube. For ease of illustration, only a portion of the array is shown. In an actual installation, there would be several such foundations and bearing adapters spaced along torque tube 20 and at least one motor or drive linkage to move the rotating assembly, thereby keeping the panels on-sun (i.e., normal to the sun) throughout the day. The tracker shown in FIG. 1A is a top-down system such as that manufactured and sold by NEXTRACKER INC, of Freemont, CA where, as discussed above, the torque tube is suspended from a pin above the tube rather than resting in a circular bearing that sits on the foundation. In this example, a unique bearing adapter is shown that not only provides a bearing to suspend the torque tube from and bounds the extent of the tube's East and West swing, but also as discussed in greater detail herein, completes the A-frame by interconnecting the free ends of each truss leg to form a rigid truss foundation. In various embodiments, this connection is effected by inserting a portion of the bearing adapter into each leg and crimping it in place.

In this example, bearing adapter 30 has a cardioid shape. The cardioid shape is characterized by a pair of symmetric S-shaped arms that follow opposing S-shaped paths and meet in the middle at a cusp. The distal end of each S-shaped arm is spaced apart and angled to match the angle and distance between the adjacent legs of the truss foundation. It should be appreciated that other shapes may also be possible.

Figure 1B:
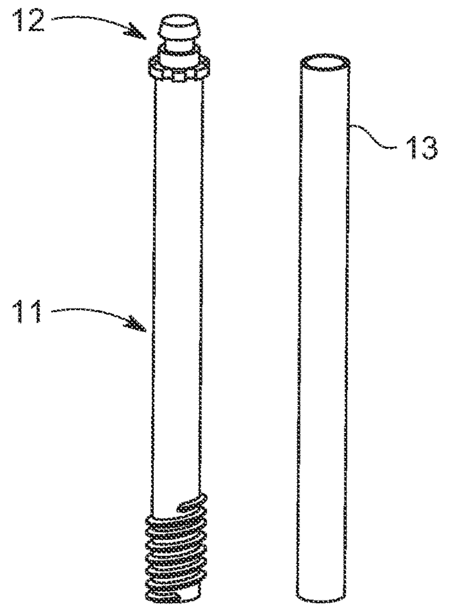
FIG. 1B shows components of a truss foundation leg usable with various exemplary embodiments of the invention.

FIG. 1B shows leg components of truss foundation system 10. They include a pair of screw anchors 11, a pair of upper leg sections 13 and a driving coupler 12 at the upper end of the screw anchor. Coupler 12 is used to drive the screw anchor into supporting ground as well as to join the upper leg to the screw anchor. In some embodiments, this coupler or collar may be welded to the head of each screw anchor. In other embodiments, it may be pinned on in the field before or after the screw anchor is driven. The coupler may have teeth formed in it to enable the it to mate with the driving head of a rotary driving machine to transfer torque to the screw anchor while driving. Once the pair of adjacent screw anchors are driven at the desired foundation location, the bearing adapter is held in place at the appropriate location. Then upper or extension piles are coupled to their respective base piles and to the bearing adapter. In various embodiments this is accomplished by inserting an end of each upper pile over the coupler or collar until it rests on the ledge of the coupler. The alternating sloped surfaces of the coupler allow the upper pile to be adjusted axially so that both are in the same plane and point at the desired work point. Once the proper alignment is achieved, a crimping tool may be used to crimp the portion of the upper leg section over the channel formed in the coupler to lock the upper leg to the screw anchor and to preserve the orientation of the upper leg sections. Then, the bearing housing assembly is attached to free ends of the upper leg section to complete the truss foundation, as discussed in greater detail below.

As shown, screw anchor 11 includes an external thread form at the lower end. In various embodiments, such a screw anchor is driven into the ground with a rotary driver until the driven end is at or near to grade. In various embodiments, adjacent legs 10 are driven at reciprocal angles to one another. For example, the piles may be driven at ±60 degrees, leaning towards one another. In other embodiments, they may be driven at reciprocal angles in a range spanning from 55 degrees to 72.5 degrees. In various embodiments, a coupler may be attached to the head of each screw anchor. It should be appreciated that although a crimp coupler is shown in the figures, that other techniques may be used to couple upper leg sections to their respective screw anchors without departing from the spirit or scope of the invention.

Figure 2:
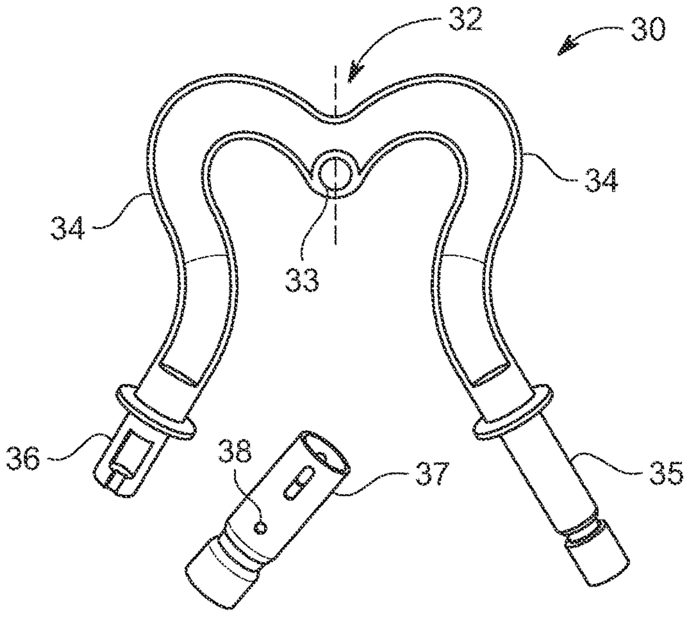
FIG. 2 shows a bearing adapter according to various exemplary embodiments of the invention.

FIG. 2 shows a front view of bearing adapter 30 of FIG. 1 according to various embodiments of the invention. Bearing adapter 30 comprises a generally cardioid-shaped member formed with a central cusp 32 and a pair of symmetric opposing S-shaped arms 34 projecting toward and away from cusp 32. In various embodiments, adapter 30 may be formed by casting steel. In other embodiments, the assembly may be cold formed, such as through a stamping process. In various embodiments, a bearing such as bearing 33 is located at or near cusp 32 along the vertical midline of the assembly. In this context, "vertical" refers to the orientation of the assembly when it is installed with the cusp at the top and the distal end of each S-shaped arm at the bottom. In this example, bearing 33 consists of a tubular recess passing completely through the body of adapter 30. Each S-shaped arm 34 extends away from cusp 32, then curves back toward it before curving away to match the spacing and angle of truss legs 10. As discussed above, the terminal end of arms 34 may curve down and away from the midline at an angle in a range of 17.5 degrees to 35 degrees to match the angle of the corresponding truss legs 10, which are oriented at an angle in a range of 55 degrees to 72.5 degrees.

In various embodiments, and as shown here, although S-shaped arms 34 are symmetric, their distal features are not. The reason for this is that if both arms have ends that are the same length, it may not be possible to simultaneously insert the ends into their respective angled upper legs 13 even before they are crimped to screw anchors 11. Therefore, in the example of FIG. 2, one arm terminates in a welded crimp sleeve 35 that extends several inches beyond the end of arm 34 but along the same axis. In various embodiments, and as shown, welded crimp sleeve 34 is welded to the end of the arm and includes a crimp joint proximate to its distal end. The crimp joint is characterized by a section of narrower diameter that allows room for the upper pile to be crimped towards it. End portion 36 of the opposing arm is relatively shorter and includes a sleeve with twist-lock features. In this case, female features are shown, but in other embodiments male features may be used, or even a combination of male and female features. A detached twist-lock sleeve 37 is used to interface the relatively shorter twist-lock sleeve 36 to its upper leg 13, and by extension, bearing adapter 30 to truss legs 10.

Installation of the components shown in FIGS. 1A/B and 2 is achieved as follows. Screw anchors 11 and upper legs 13 are installed in the manner discussed above in the context of FIG. 1B. Then, the relatively long welded crimp sleeve 35 of bearing adapter 30 is inserted into the free end of one of the upper legs. In various embodiments, crimp sleeve 35 will have an outside diameter slightly smaller than the inside diameter of upper leg 13 to enable a smooth fit with minimal slop. Crimp sleeve 35 may be uniform in diameter enabling the assembly to be rotated 360-degrees within upper leg 13 to rotate adapter 30 out of the way while the other side is configured.

Next, detached twist-lock crimp sleeve 37 inserted into the free end of the other upper leg so that the crimp joint end is down. In various embodiments, bump stop 38 is formed in sleeve 37 to prevent it from disappearing down into upper leg 13. Once inserted, adapter 30 is rotated around so that the relatively shorter twist-lock sleeve 36 is pointing at the inserted detached sleeve 37. Sleeve 37 is then slid axially upwards within the leg until it engages relatively shorter twist-lock sleeve 36. When the male and female features are properly oriented, detached sleeve 37 will slide up towards the arm 34. Once fully inserted, detached sleeve 37 is then rotated either clockwise or counter clockwise, until the male features are seated firmly against their respective stops. At this point, granular adjustment between adapter 30 and upper legs 13 may be performed by lifting or pushing down on bearing adapter 30 until bearing 33 is aligned with the desired work point and/or with other bearings in the same row. Installation is completed by crimping each upper leg 13 over the crimp joints formed in each of the detached and welded crimp sleeves 37/35. The crimp joints will preserve the assembly at the desired orientation. Crimping may be performed with a powered hand-held crimping device or an articulating crimper attached to the machine used to install the base piles.

Figure 3A:
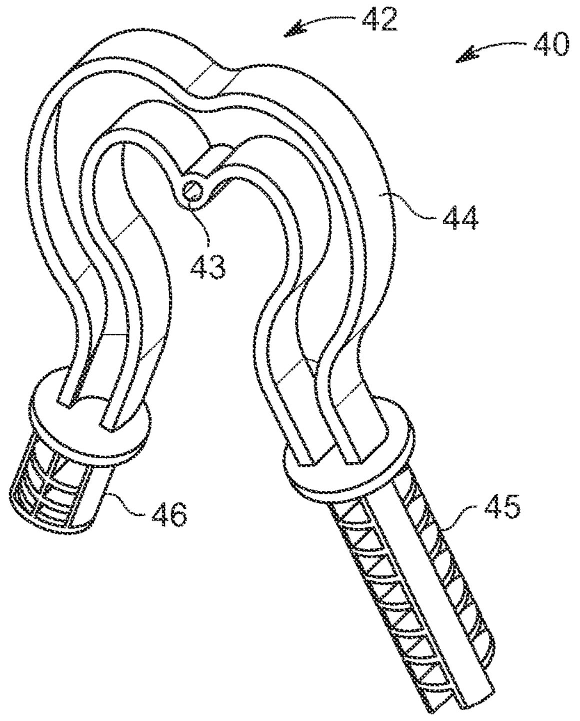
FIGS. 3A-C show another bearing adapter usable with a truss foundation according to various exemplary embodiments of the invention.
Figure 3B:
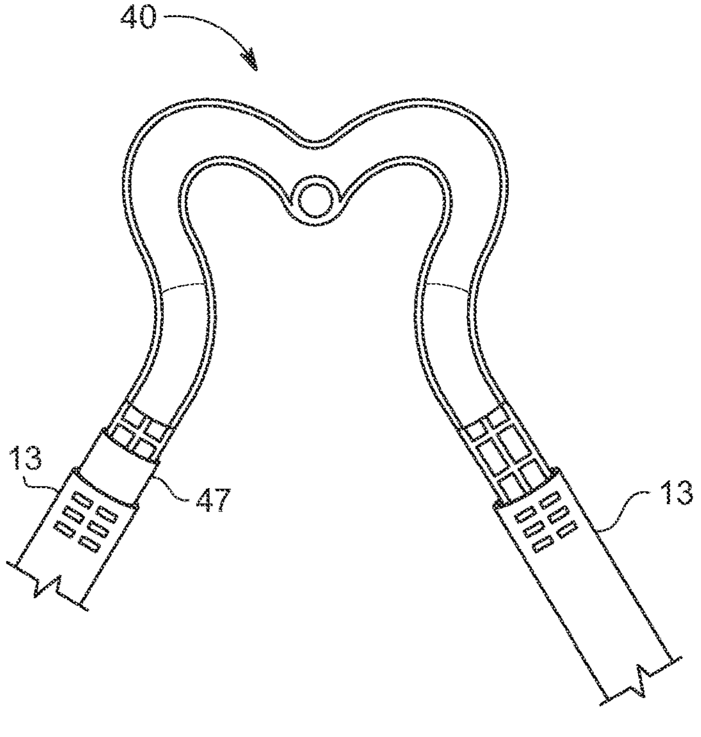
Figure 3C:
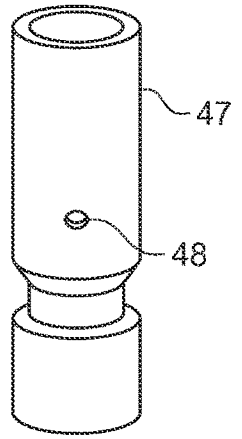

Turning to FIGS. 3A-C, these figures show bearing adapter 40 according to various other exemplary embodiments of the invention. As with the exemplary embodiment shown in FIG. 2, adapter 40 is also characterized by a cardioid-shaped structure with a centrally positioned cusp 42 and a pair of symmetric opposing S-shaped arms 44 curving towards and away from the cusp. An integral bearing 43 positioned under cusp 42 and consists of an axial opening passing through adapter 40. As discussed herein, the adapter 40 may be formed from one or more cast pieces, by stamping, or by some other process. In this embodiment, each S-shaped arm 44 terminates in a crimp arm 45/46. Crimp arms 45/46 may be formed from the same casting as adapter 40 or may be formed separately and welded on after assembly 40 is formed. In this example, one arm 46 is labeled as the short crimp arm and the other the long crimp arm 45. The reason for having arms of different lengths is the same as that discussed above in the context of FIG. 2—that is, to enable simultaneous fitment with fixed upper legs 13. As shown in 3A and B, the crimp arms 45/46 include a plurality of crimp features. In these figures, the crimp features consist of a plurality of alternating ribs and voids as well as flat faces that provide clearance for upper leg 13 to be sleeved towards the crimp arm. This embodiment also includes detached crimp sleeve 47. Like the crimp sleeve 37 of the embodiment of FIG. 2, crimp sleeve 47 includes a crimp joint proximate to one end. Unlike sleeve 37, there are no twist-lock features present because the sleeve fits directly over short crimp arm 46 of adapter 40 and is crimped in place.

System installation is similar to that of adapter 30 of FIG. 2. After installing screw anchors 11 and upper legs 13, installation of bearing adapter 40 may begin. In this exemplary embodiment, installation begins by inserting long crimp arm 45 into a free end of one of the upper legs. In various embodiments, the outside diameter of crimp arm 45 is made slightly smaller than the inside diameter of upper leg 13 to allow the arm to easily enter but without too much slop. Once inside, adapter 40 may be rotated out of the way to allow access to the free end of the adjacent upper leg. The end of the crimp sleeve 47 containing the crimp joint is slid into the free end of the upper leg until bump stop 48 leg's opening. Then, adapter 40 is rotated back into play so that shorter crimp arm 46 is pointing at the detached crimp sleeve 47. Sleeve 47 is then slid back up until it covers at least a portion of short crimp arm 46. Bearing adapter 40 is then leveled and bearing 43 is aligned with the height and East-West position of the desired work point. Once aligned, upper leg 13 is crimped over the crimp joint area of the crimp sleeve 47 and directly on the sleeve along the portion of the sleeve that overlaps with the short crimp arm 46. Finally, the other leg is crimped to engage long crimp arm 45, thereby maintaining the orientation of the bearing adapter with the truss foundation's work point.

Figure 4A:
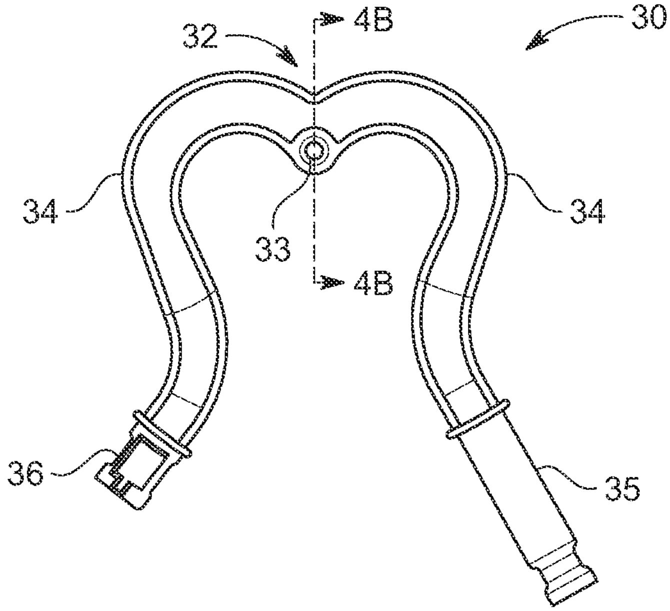
FIG. 4A shows another bearing adapter usable with a truss foundation according to further exemplary embodiments of the invention.
Figure 4B:
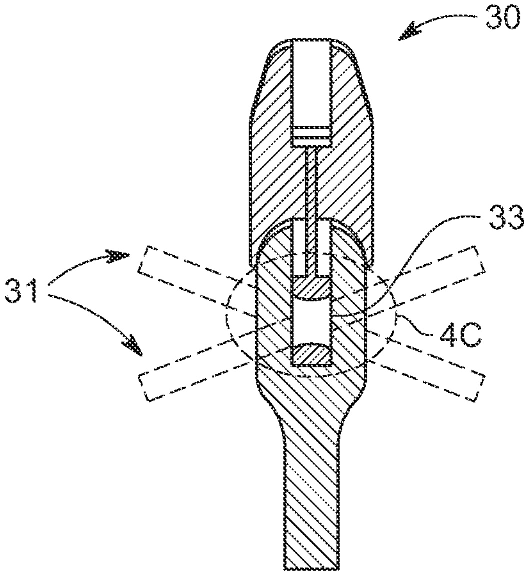
FIGS. 4B and 4C show a bearing adapter with a catenoid-shaped bearing opening according to various exemplary embodiments.
Figure 4C:
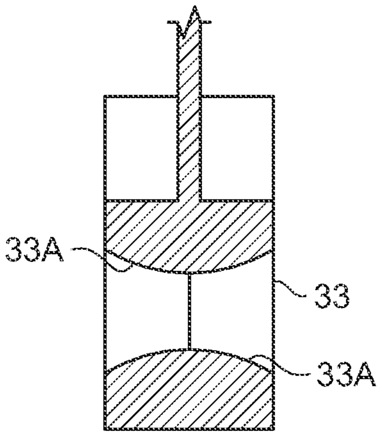

Turning now to FIGS. 4A-C, these figures show features of a bearing adapter, in this case, adapter 30 shown in FIG. 2, that may be used with various embodiments of the invention. Although the bearing housing shown in 4A matches the one in FIG. 2, it should be appreciated that adapter 40 of FIG. 3A-C, or even other adapters, may be also be used with the various embodiments shown in FIGS. 4A-C. In fact, these features may be usable with various other types of top-down or even bottom-up style trackers as well. Starting with 4A, this figure shows a front view of exemplary bearing adapter 30. As with the other adapters, it is substantially cardioid-shaped with opposing symmetrical S-shaped arms 34. Line A-A bisecting the middle of adapter 30 passes through cusp 32 and bearing 33 below it. FIG. 4B shows an internal cross-sectional view taken along bisecting line A-A and FIG. 4C is a close-up of bearing surfaces 33A inside the adapter 30. As seen in 4B and 4C, bearing 33 in adapter 30 is an opening passing completely through adapter 30 that provides a bearing surface for a bearing pin to rotate within. The bearing surfaces 33A together make a catenoid shaped opening. In the cross-section view, this appears as a pair of generally convex surfaces, indicating that the diameter is narrowest at the middle and gets larger traveling towards the bearing opening on either side. Although this surface is shown as being catenoid-shaped, in some embodiments, the surface may be shaped as a ramp that goes up from either opening to an apex at the middle. When the bearing pin is inserted into bearing 33, convexly curved bearing surfaces 33A allows the pin to articulate several degrees in any direction within the bearing. In various embodiments, this may relieve stress and strain on the torque tube, torque tube support brackets, and even the foundation, due to misalignment from bearing adapter to bearing adapter, terrain variations and even thermal expansion of the torque tube. A bearing surface with a uniform diameter requires that each bearing housing be oriented substantially identically. Accomplishing that may be difficult in real world conditions where anchors are driven with heavy equipment in dirt on terrain of varying grade and moisture content. The catenoid-shaped bearing opening according to this embodiment should extend the functional life of the tracker system by allowing the bearing pin to rotate without trying to move the bearing or the foundation into alignment or trying to bend the torque tube to compensate for misalignment. The dotted line in 4B shows different possible orientations of the bearing pin within the catenoid-shaped bearing.

Figure 5:
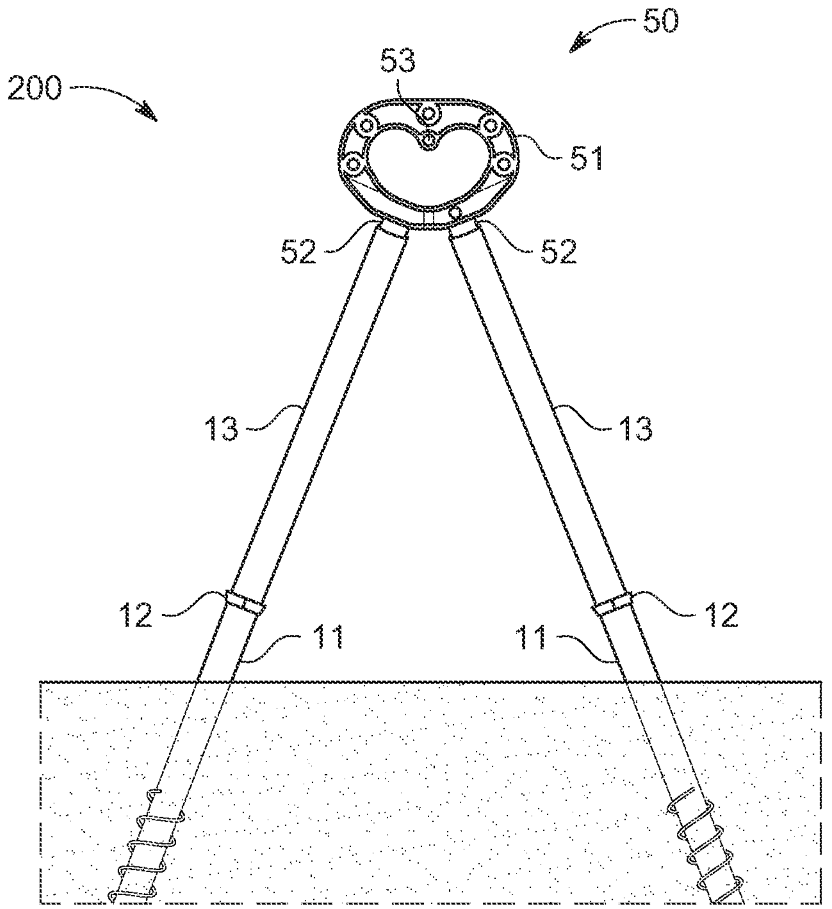
FIG. 5 shows another bearing adapter and truss foundation according to various exemplary embodiments of the invention.

Turning now to FIG. 5, this figure shows an exemplary truss foundation and bearing adapter system 200 according to various embodiments of the invention. As with other embodiments, the truss foundation consists of a pair of truss legs 10 that extend below and above ground. Each leg 10 consists of a screw anchor 11 that is driven nearly all the way into the ground and an upper leg 13 that substantially extends the axis of its corresponding screw anchor. Coupler 12, attached to the head of the screw anchor or built into it, serves as the platform on which to attach the upper leg. A crimp joint, pin, threads or other suitable mechanical fastener may be used to join the upper legs 13 to their respective screw anchors 11. Upper legs 13 terminate as open tubes. Bearing adapter 50 is the cardioid-shaped member at the top of the truss. It includes a pair of connecting portions 52 that are received into the adjacent upper legs 13 before the legs are crimped or otherwise secured to bearing adapter 50. Adapter 50 includes a provides a cardioid-shaped opening with bearing 53 formed at the cusp of that opening. In various embodiments, a bearing pin is received within bearing 53 and one or more torque tube support brackets are attached to the bearing pin to suspend the torque tube.

In some embodiments, the bearing and connecting portions may be positioned so that a line through the center of mass of each connecting portion approximately intersects at the bearing. This will result in the rotational axis of the tracker, in this example, the bearing pin, being aligned with the apex or work-point of the truss. This ensures that nearly all lateral loads are translated into the truss legs as axial forces while minimizing the extent of any bending moments. This consideration is unique to truss foundations because monopiles translate lateral loads into bending moments by design. They are oversized primarily to resist such moments.

Figure 6A:
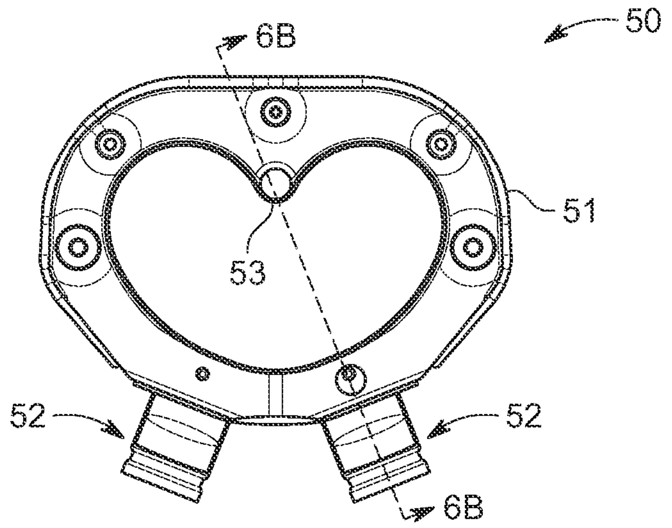
FIGS. 6A-C show various views of the exemplary bearing adapter shown in FIG. 5.
Figure 6B:
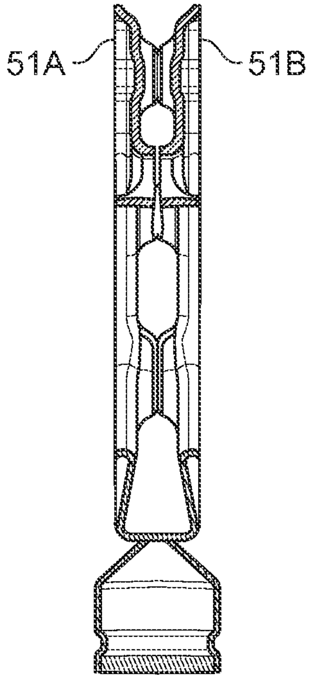
Figure 6C:
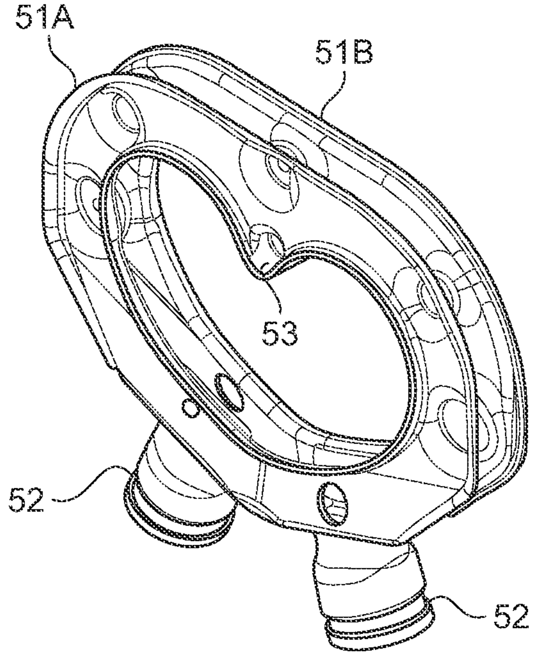

FIGS. 6A-C show front, side and perspective views respectively of bearing adapter 50 of FIGS. 6A-C. As shown, adapter 50 has a main body portion 51 that is formed form a pair of substantially identical cardioid-shaped plates labeled 51A/B in FIG. 6B that are joined with clinch or press joints. A clinch joint is formed by using a punch and die assembly to push a projection formed in one piece into recess formed in the other causing some underflow at the bottom that locks the two pieces together. Clinch joints are advantageous because they do not require heat, welding or chemicals. It should be appreciated, however, that the number of clinch joints shown here are exemplary only and should not be interpreted as limiting on the invention. Moreover, different methods other than clinching may be used or the entire piece may be made from a single casting.

Then, after the cardioid-shaped main body portion 51 is formed, a pair of connecting portions 52 are attached along the bottom of body portion 51 to join enable the adapter to join a pair of adjacent upper legs. Once pieces 51A and B are joined, connecting portions 52 may be bolted, welded or otherwise attached at the appropriate angle to match the angle of truss legs 10 and ensure that they point at bearing 53. This will maximize the extent to which lateral loads are translated into axial loads rather than bending moments.

Figure 7:
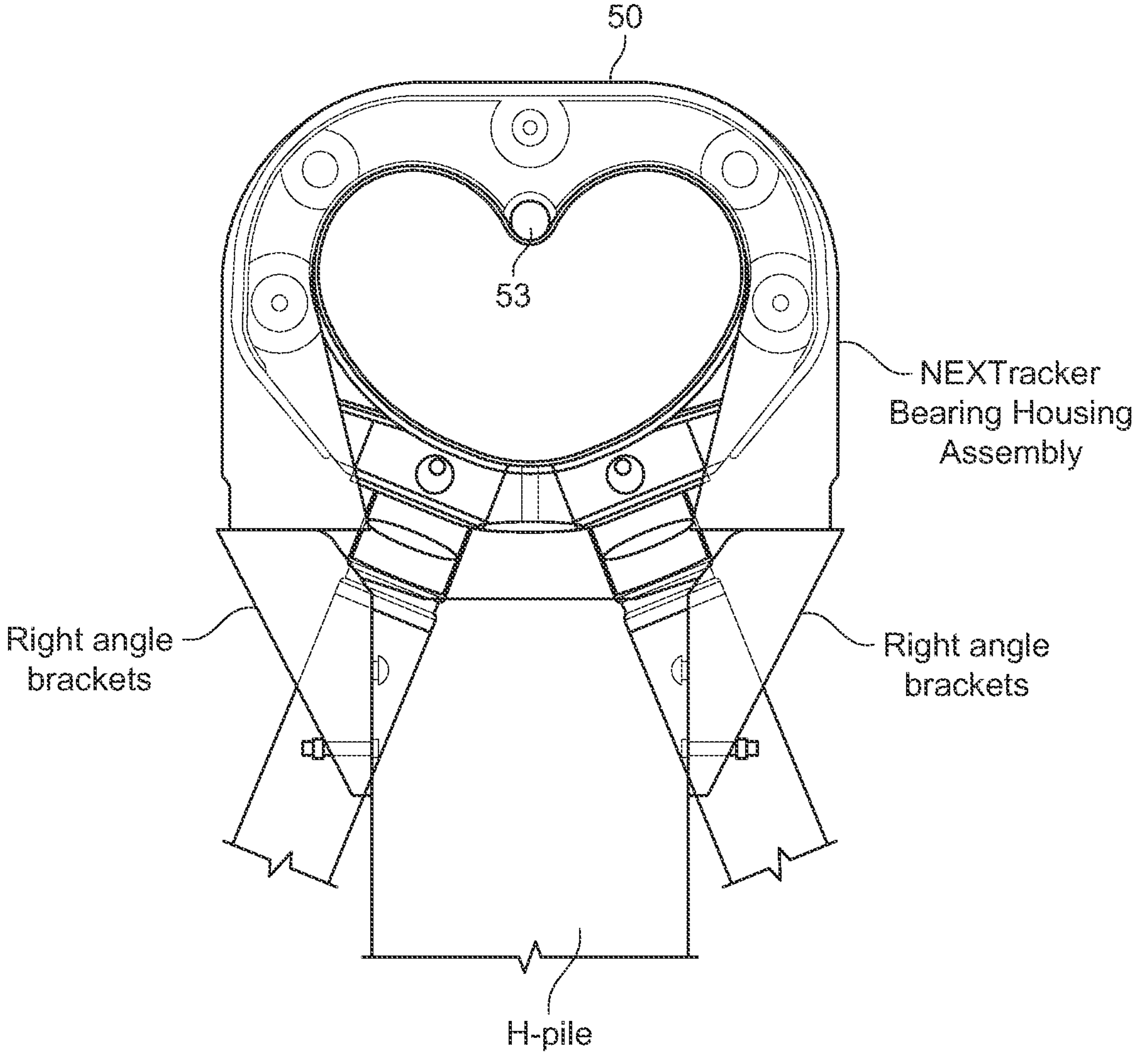
FIG. 7 shows the exemplary bearing adapter of FIG. 5 superimposed over a prior art bearing housing assembly.

FIG. 7 overlaysviews of bearing adapter 50 shown in FIGS. 5, 6A-C with a so-called bearing housing assembly used in a conventional single-axis tracker when supported by a monopile foundation. The bearing housing assembly shown here is from the NX SERIES single-axis tracker manufactured and sold by NEXTRACKER, INC of Fremont California. In this overlapping view, it can be seen that the height and width of both the bearing housing assembly (BHA) and bearing adapter 50 are substantially the same, with both defining at least a partial cardioid-shaped opening and having co-located bearings. The NEXTRACKER BHA is designed to sit on a flat surface, but the swing of the torque tube requires greater spacing than can be provided by a 6-inch wide H-pile (e.g., W6×9 or W6×12). Therefore, NEXTRACKER manufactures right angle brackets that provide a horizontal mounting surface for the BHA and also translate the load of the tracker into vertical interfaces that can be attached to the opposing flanges of the H-pile. They also widen the stance of the H-pile to accommodate the cardioid-shaped opening. Finally, they raise the height of the bearing and provide some degree of vertical height adjustment to be aligned with other BHAs in the same row.

By contrast, the truss foundations and bearing adapters according to various embodiments of the invention enable the apex truss adapter, H-pile flanges, right angle brackets and the bearing assembly to be functionally combined into a single part, making the single-axis tracker less expensive when supported by a truss foundation and bearing adapter relative to a monopile. The bearing adapter coupled to truss legs eliminates the need for the pedestals, right-angle brackets H-pile flanges and the numerous Huck bolts or other fasteners used to connect these components together. It accomplishes all this while remaining dimensionally compatible with the remaining single-axis tracker components (e.g., bearing pin, torque tube support bracket, torque tube, module brackets, etc.).

It should be appreciated that in tracker arrays, not all system components are exposed to the same forces. The outer row or first few outer rows may be made more robust than the rows making up the inside of the array since the interior rows are to some extent shielded from wind by the outer ones. To that end, tracker components and even foundation components may differ between outer rows and inner ones, as well as between those that supporting the torque tube versus those supporting drive motors and/or other driveline components. In various embodiments, the bearing adapters shown in FIGS. 3A, 4A, 5 and 6A-C are designed for standard loads, that is, internal portions of the tracker array depending on where the tracker is installed, soil conditions, and prevailing weather, among other factors. Trusses and bearing adapters intended for outside rows may have different configurations such as shown in subsequent embodiments.

Figure 8:
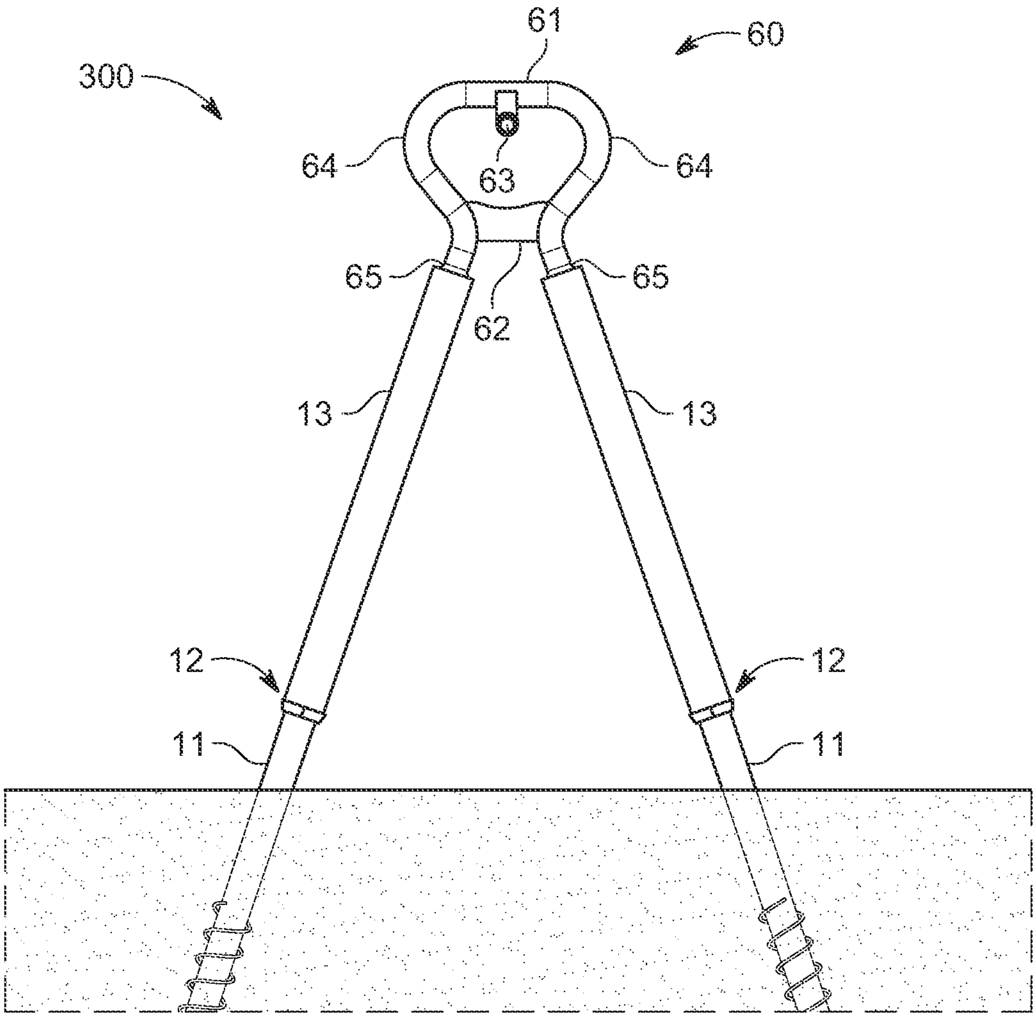
FIG. 8 shows another bearing adapter and truss foundation according to various exemplary embodiments of the invention.
Figure 9A:
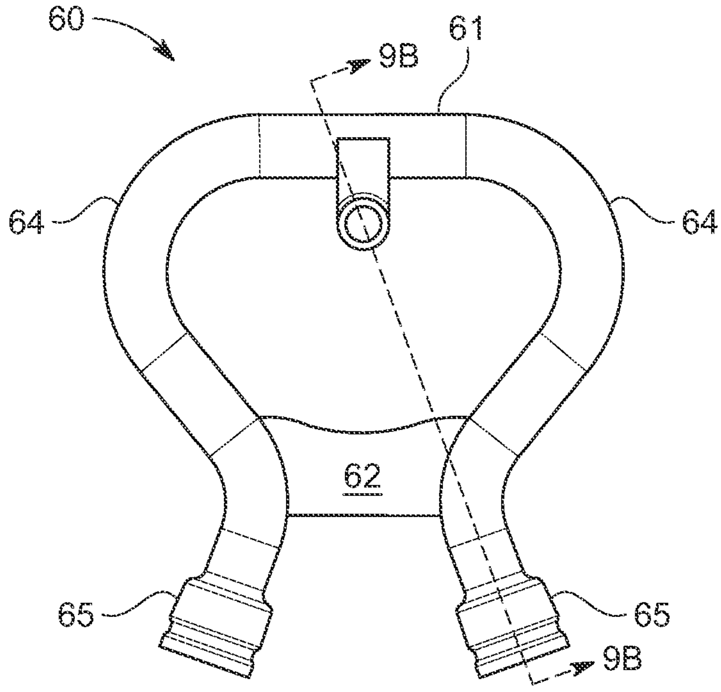
FIGS. 9A-C show different views of the bearing adapter shown in FIG. 8.
Figure 9B:
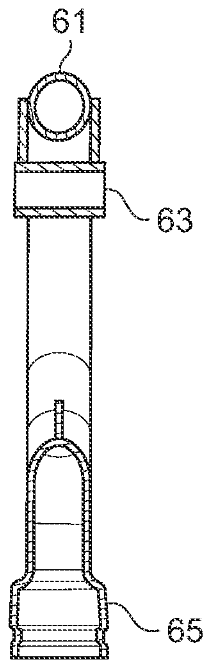
Figure 9C:
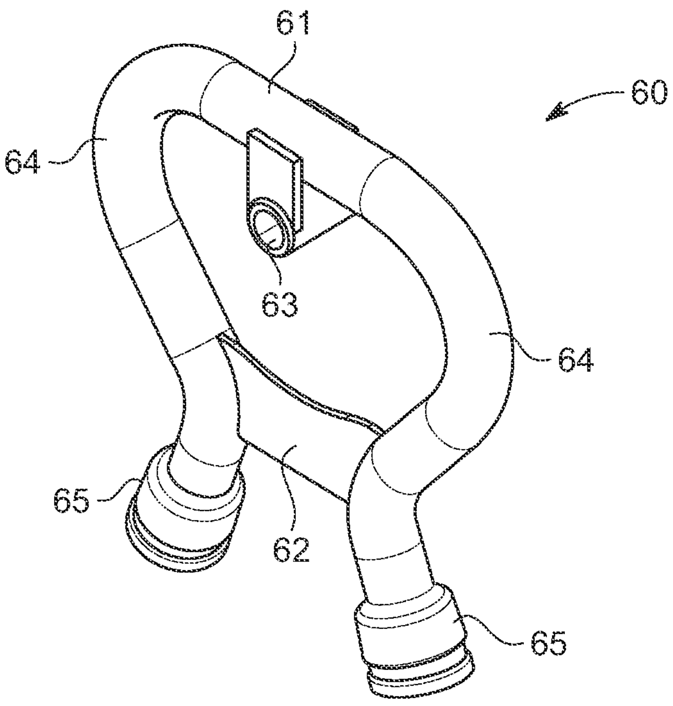

Turning now to FIG. 8, as well as FIGS. 9A-C, these figures show another truss foundation and bearing adapter according to various embodiments of the invention that may be more suitable for outside rows and/or installations that require greater strength than the bearing adapters shown in association with other embodiments. Beginning with FIG. 8, this figure shows a truss foundation 300 and bearing adapter 60 according to various other embodiments of the invention. The lower portion of the truss foundation shown here is substantially the same as that in other embodiments. It is made up of a pair of truss legs 10 that each consist of a driven screw 11 anchor coupled to an upper leg 13 via coupler 12. One or more crimps, bolts or other mechanical fasteners may secure each upper leg 13 to its respective coupler. Alternatively, coupler 12 may be a separate casting or piece that is attached to the lower end of the upper leg or a set of features that are stamped or otherwise formed in the upper end of the screw anchor.

The truss legs shown in these figures are also joined by bearing adapter 60, which in this example, may be stronger than that shown in FIG. 1. The bearing adapter shown here is formed from a pair of tubular S-shaped members 64 that are joined at one end by a straight bridge member 61 with bearing 63 in the approximate middle. The other end of each S-shaped member 64 terminates in a connecting portion 65 that, in various embodiments, is received within the open end of each upper leg 13. In addition, as shown, a gusset plate 62, brace or other reinforcement may connect S-shaped members 64 at their narrowest point to resist separation and torsion. In various embodiments, bearing adapter 60 may be formed of bent steel tube, interconnected sections of steel tube or a combination of these, and may have a round, square, or oval cross-section, among other possibilities.

FIGS. 9A-C are front, section and perspective views respectively of bearing adapter 60 shown in FIG. 8. FIG. 9B is a section view along the line A-A in 9A. As seen in 9A, bearing adapter 60 is made of a pair of substantially identical but opposing S-shaped members 64 that begin at a common bridge portion 61 in the middle of the adapter and terminate in respective connecting portions 65. Bridge 61 includes bearing 63 that in this example, is welded to brackets on either side of the bridge and hangs slightly below the bridge so that bearing 63 passes entirely through adapter 60. Alternatively, bearing 63 may be built into bridge 61. Gusset plate or support brace 62 joins opposing S-shaped members 64 at their narrowest point to provide extra strength. As shown, connecting portions 65 are adapted to fit within respective upper legs 13 so that legs 13 may be crimped around them. It should be appreciated that in other embodiments, upper legs 13 may fit inside the connecting portions and that bolts, pins, or other suitable mechanical fasteners may be used to join connecting portions 65 to their respective upper legs 13.

Figure 10:
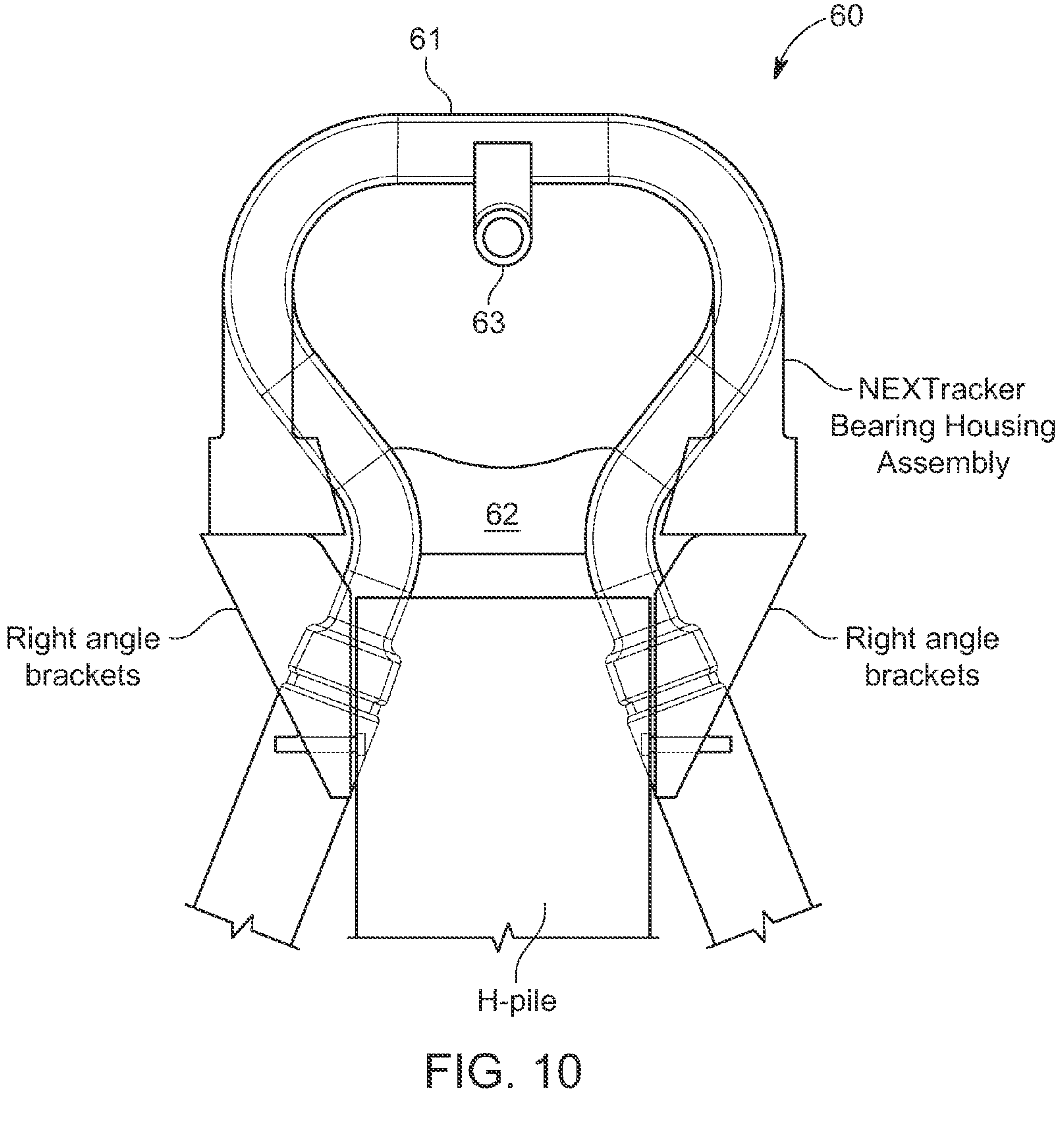
FIG. 10 shows the bearing adapter of FIG. 8 superimposed over a prior art bearing housing assembly.

FIG. 10 is a front view of bearing adapter 60 shown in FIGS. 8 and 9A-C superimposed with a conventional prior art bearing housing assembly. The prior art BHA is again a NEXTRACKER NX SERIES single-axis tracker that has been designed to attach to a single H-pile. It is formed from an upside-down-U-shaped section of steel tube that terminates on either side in a set of pedestals that rest on respective right-angle brackets attached to the vertical flanges of the H-pile. As seen in image of FIG. 10, as with the bearing adapter shown in FIG. 7, the bearings of the prior art BHA and bearing adapter 60 according to the various embodiment of the invention overlap and the height and width of these structures are substantially the same. The differences lie in the bearing adapter's bottom end geometry that allows it to mate with angled truss legs rather than a conventional H-pile. This eliminates the need for the pedestals, right-angle brackets and upper flanges of the H-pile as well as the Huck bolts or other fasteners used to connect them together while remaining dimensionally compatible with the remaining single-axis tracker components (e.g., bearing pin, torque tube support bracket, torque tube, module brackets, etc.).

Figure 11:
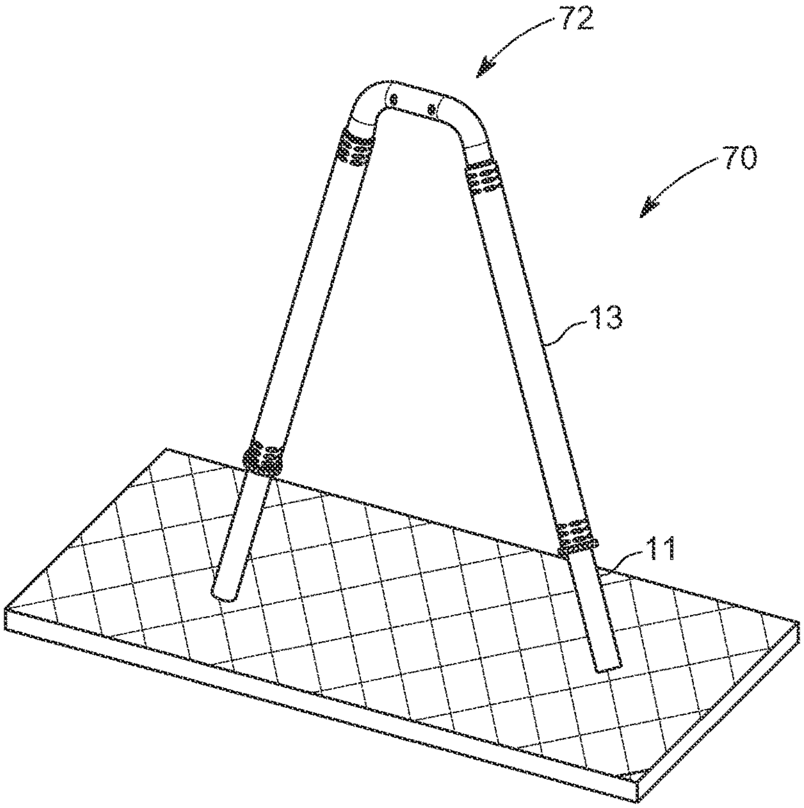
FIG. 11 is a truss foundation for a single-axis solar tracker compatible with various embodiments of the invention.
Figure 12:
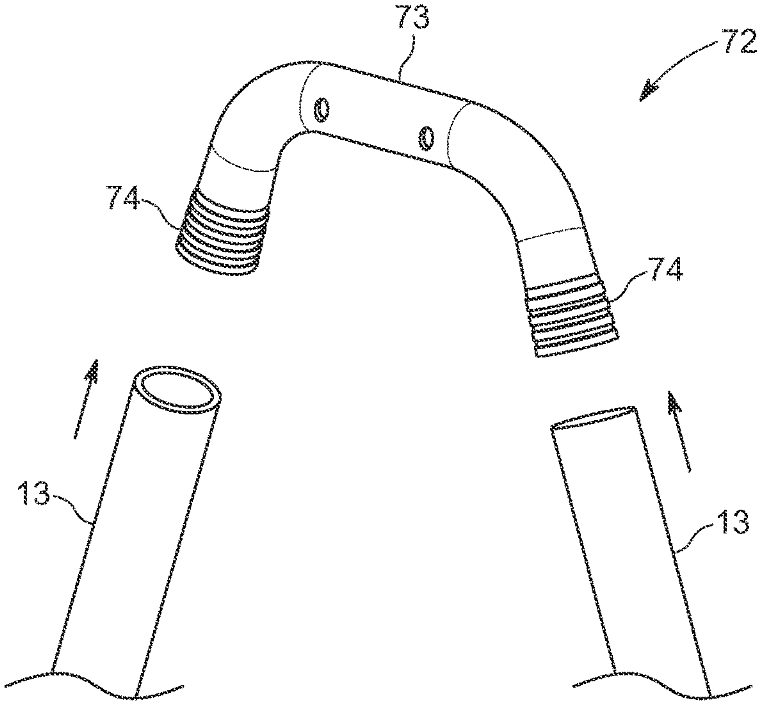
FIG. 12 is a partially exploded view of a portion of the truss foundation shown in FIG. 11.

Turning now to FIGS. 11 and 12, these figures show truss foundation 70 for supporting a single-axis solar tracker such as the mechanically balanced single-axis trackers manufactured and sold by NEXTRACKER INC of Fremont, California. As shown in the exemplary figure, the foundation consists of a pair of driven screw anchors 11. Screw anchors as shown are driven into the ground at angles to one another so that their center axes point at a desired location in free space above the truss. This may align with the rotational axis of the tracker, or, in other cases, may be at a point above the rotational axis depending on the degree to which the particular foundation experiences predominantly lateral loads or moments when supporting a tracker. To assemble the foundation, the adapter or truss cap 72 is positioned above the driven screw anchors 11 and held in place, such as, for example, by a jig on the installation and assembly machine used to drive the screw anchors. A pair of upper leg portions 13 are sleeved over connecting portions 74 on the truss cap and down onto a driving coupler on the head of each screw anchors. While truss cap 73 is held at the correct position, the portions of upper legs 13 that overlap with connecting portions 74 and with the driven screw anchors may be crimped together to lock in the geometry of the foundation. Channels formed in connecting portions 74 provide voids for upper leg 13 to be deformed into during the crimping operation. Once assembled the foundation looks like foundation 70 of FIG. 11, typically straddling an intended North-South oriented tracker row. Several such foundation will extend along this row to support the length of the tracker torque tube.

As shown, truss cap or adapter 72 has a center bridge portion 73 that consists of a section of tube with a pair of mounting holes for attaching the tracker bearing components. These components hold the torque tube while allowing it to rotate through its full range of motion. A plate, adapter, or other piece (not shown) may be used to integrate the standard tracker bearing component with adapter 72.

Figure 13:
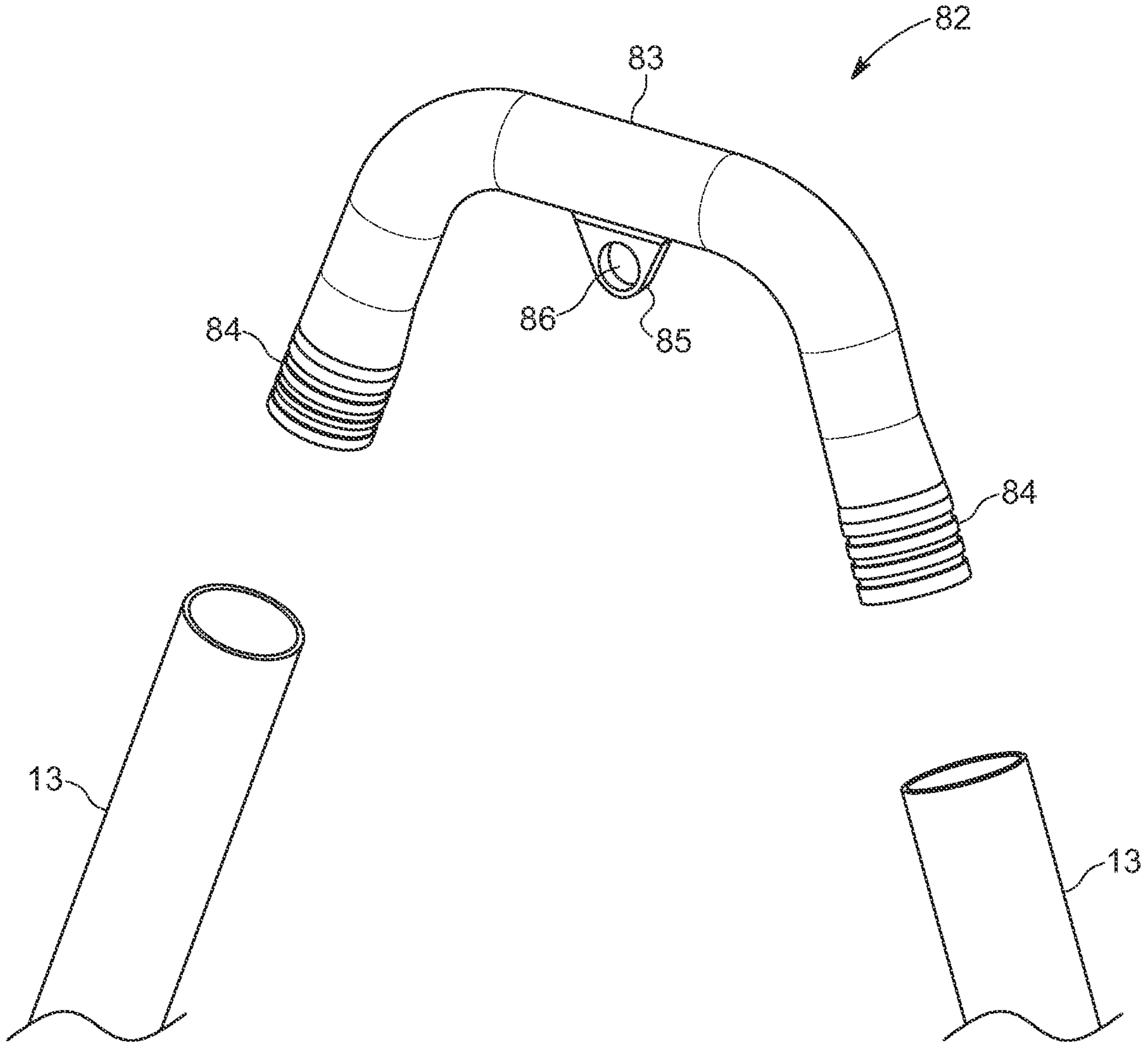
FIG. 13 is a partially exploded view of a portion of a bearing adapter and truss foundation for single-axis trackers according to various exemplary embodiments of the invention.
Figure 14:
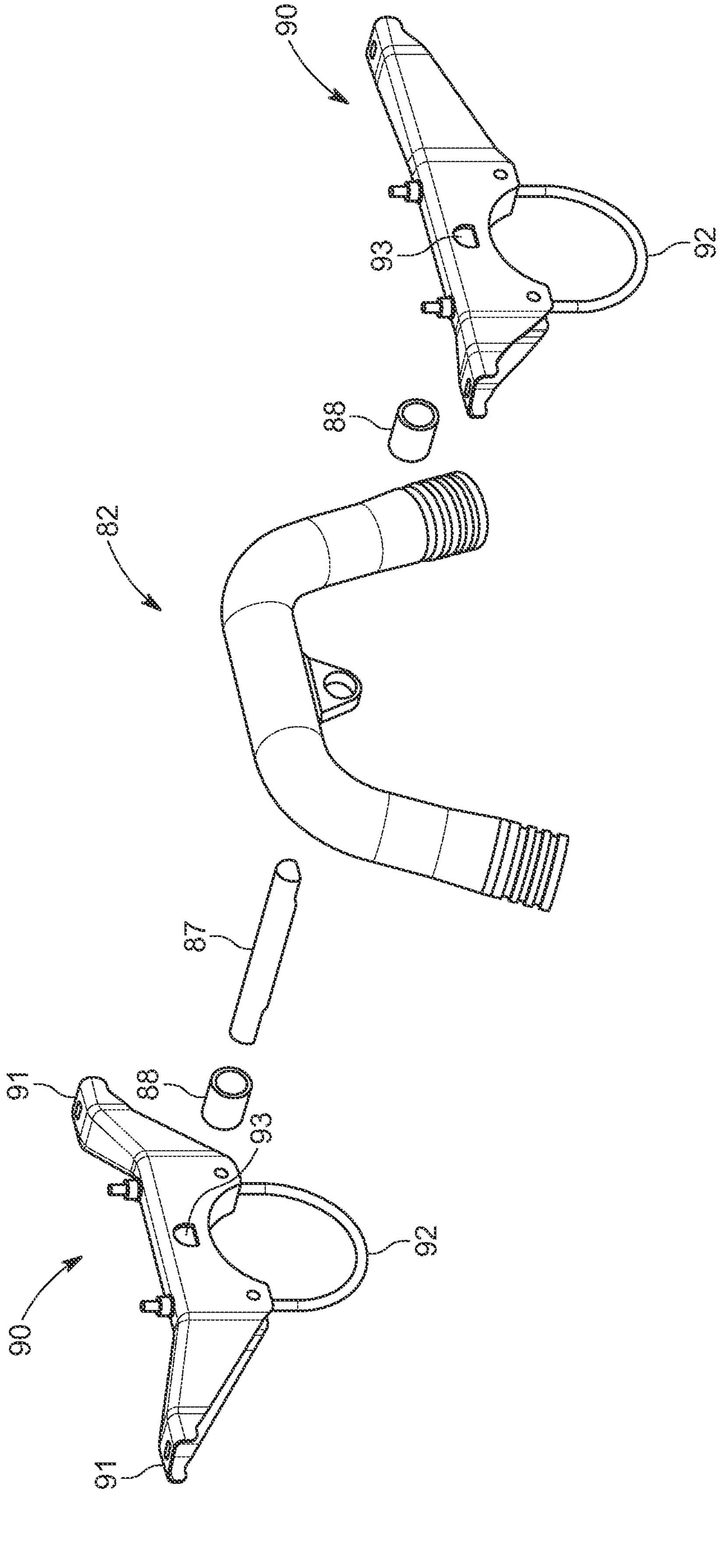
FIG. 14 is a partially exploded view of a bearing adapter and tracker components for use with a truss foundation for single-axis trackers according to various exemplary embodiments of the invention.
Figure 15:
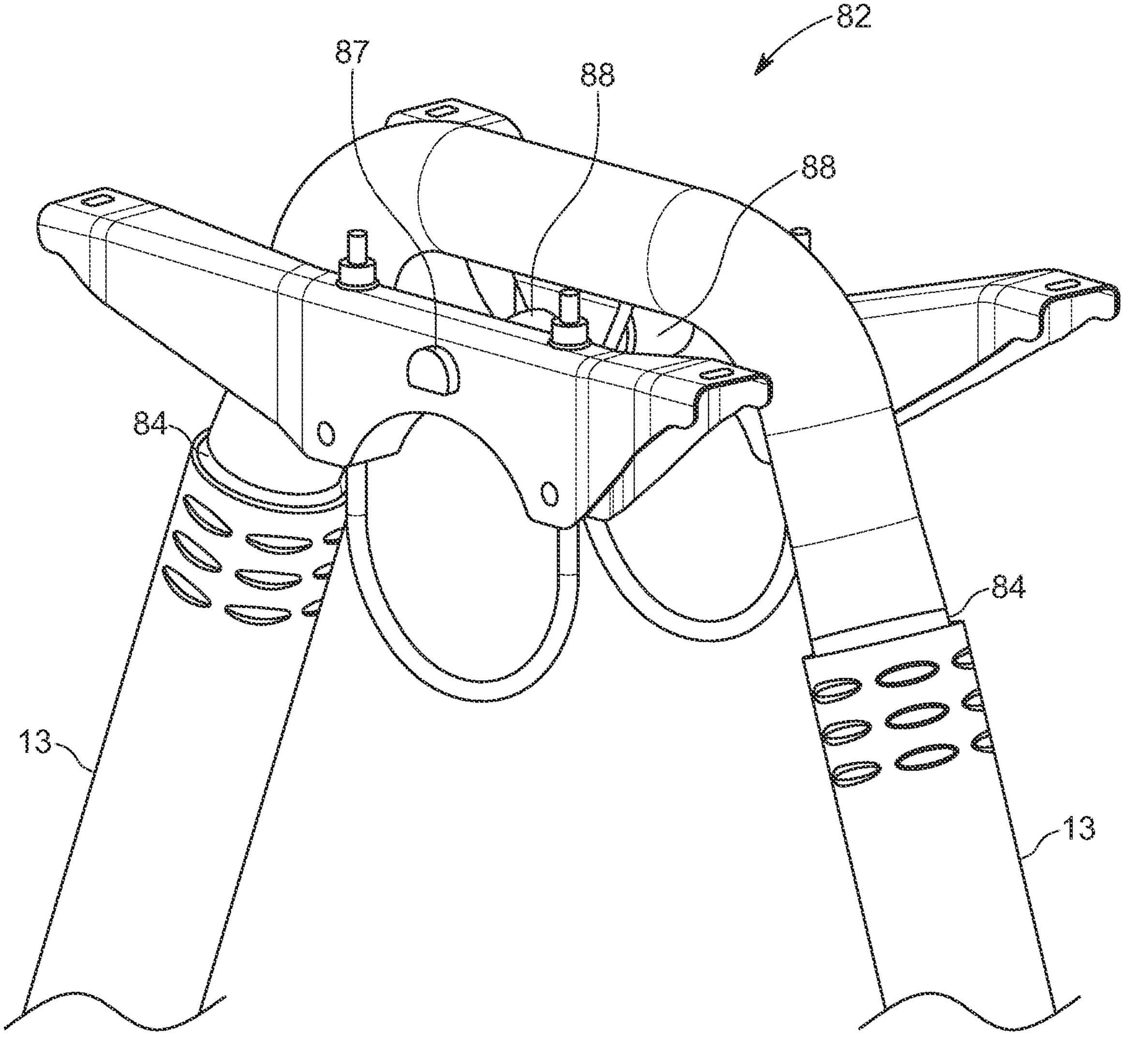
FIG. 15 is a perspective view of the exemplary bearing adapter shown in FIG. 13.

As discussed herein, in various embodiments, it may be desirable to integrate the tracker bearing components with the foundation to reduce part count and mechanical redundancy. To that end, FIG. 13 shows another bearing adapter 82 usable with a truss foundation according to various exemplary embodiments of the invention. Like adapter 72, adapter 82 is a section of tubular pipe with connecting portions 84 at either end for receiving crimp connections, and a central bridge portion 83. Central bridge portion 83 of this adapter has a bearing 85 suspended from it with bearing opening 86. This eliminates the need for separate bearing components when the truss foundation is used to support a mechanically balanced tracker where the torque tube is suspended from a bearing pin rather than free to rotate about its own axis. In various embodiment, and as shown in FIGS. 14 and 15, when supporting such a tracker, a bearing pin such as pin 87 be inserted into bearing opening 86 so as to project some distance (e.g., 2 inches) out of either side of the opening. Spacers 88 may be sleeved other either distal end of the pin to keep solar panel brackets 90 from binding against adapter 82 during use. The torque tube may bend with the terrain and with wind and snow loading and may also expand and contract due to thermal variations so spacers 88 will enable the system to tolerate these forces without metal components binding against one another. In various embodiments, solar panel brackets 90 have holes 93 to receive an end of pin 87. As shown, each bracket 90 has a U-bolt for securing the torque tube and a pair of panel supports 91 flared out and upward to enable to the panels to clear the adapter when they are mounted. It should be appreciated that other bracket designs are possible as well. Also, the bearing pin, spacers and panel support brackets or some subset of these components may come preassembled with truss cap or adapter 82. In other embodiments, these components may be added in the field, after the truss foundation is assembled.

Figure 16:
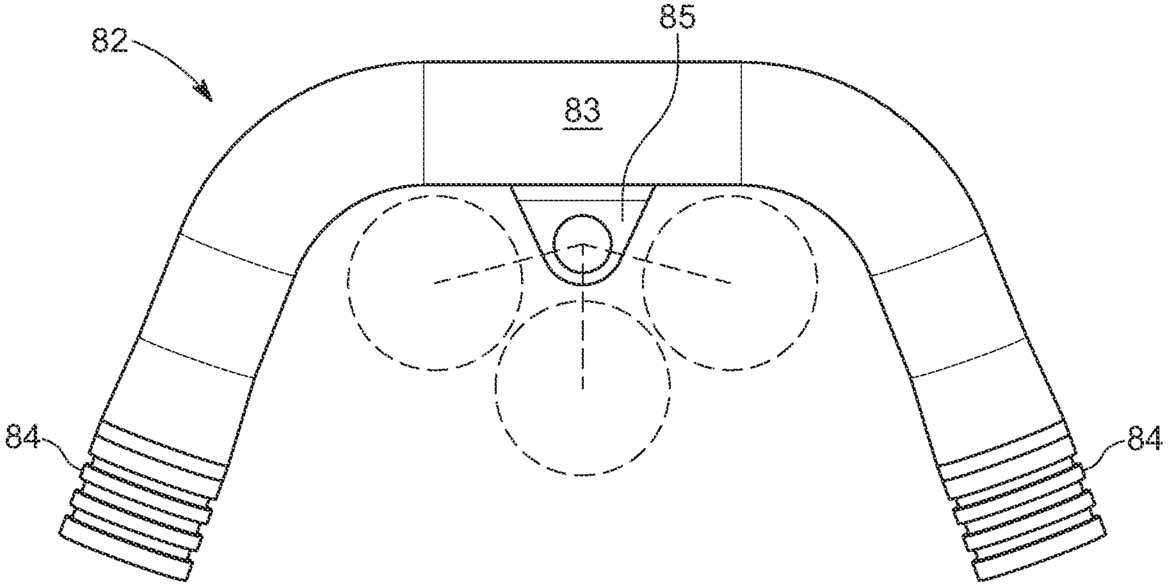
FIG. 16 is a front view of the bearing adapter shown in FIG. 13.
Figure 17:
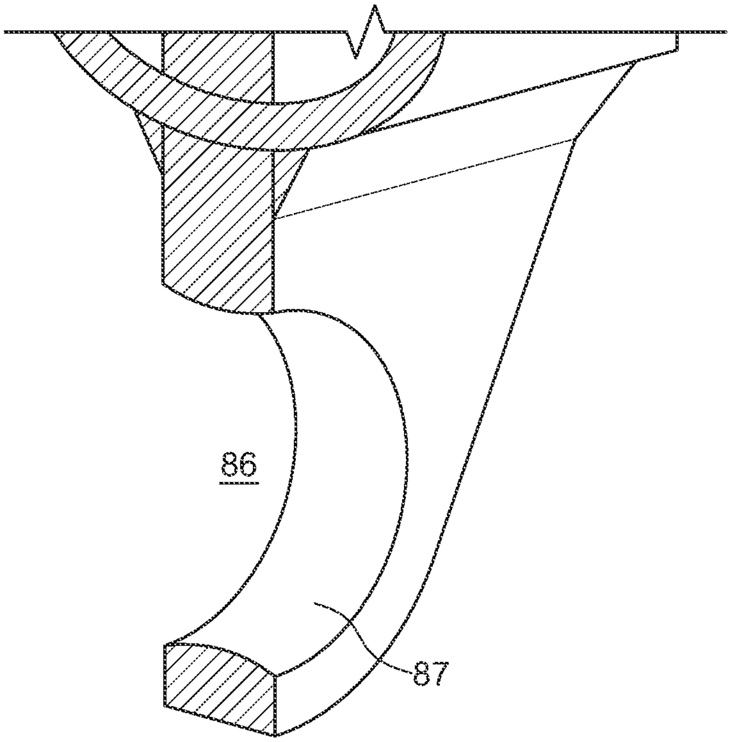
FIG. 17 is a partial cutaway view of the bearing opening of the exemplary bearing adapter shown in FIG. 13.

Turning now to FIG. 16, this figure shows a front view of adapter 82. As shown, the spacing between either side of and below bearing 85 provides clearance for the torque tube to swing through an arc as the it moves from East-facing to West-facing each day. The adapter provides a hard stop to prevent over rotation of the torque tube in either direction. As discussed in the context of FIGS. 4B and 4C, wall 87 of bearing opening 86 may have a catenoid shape that enables the circular profiled bearing pin to pivot about its middle to different orientations with respect to bearing opening 86. This may help accommodate axial direction changes in the torque tube from foundation to foundation in a single tracker row.

The embodiments of the present inventions are not to be limited in scope by the specific embodiments described herein. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

The invention claimed is:

1. A truss foundation with an integrated tracker comprising:

a pair of screw anchors;

a pair of upper leg sections coupled to the pair of screw anchors and including a cavity at an end portion; and a bearing adapter, the bearing adapter comprising:

a pair of connecting portions at the distal end of the bearing adapter, angled apart from one another, and received within the cavity at the end portion of the pair of upper leg sections, a bearing positioned at an approximate middle of the bearing adapter, and a bearing pin seated in the bearing.

2. The truss foundation according to claim 1, further comprising a pair of torque tube module brackets attached to opposing ends of the bearing pin with respective spacers between each module bracket and the bearing.

3. The truss foundation according to claim 1, wherein the bearing comprises a catenoid-shaped opening.

4. The truss foundation according to claim 1, wherein the pair of connecting portions includes a crimp sleeve received within the cavity at the end portion of the pair of upper leg sections.

5. The truss foundation according to claim 1, wherein the pair of connecting portions includes a twist lock sleeve having a bump stop to limit coaxial insertion of the a pair of connecting portions into the cavity at the end portion of the pair of upper leg sections.

6. The truss foundation according to claim 1, wherein the pair of connecting portions terminate in respective crimp connectors having at least one channel circumscribing an outer surface thereof.

7. The truss foundation according to claim 1, wherein the bearing adaptor includes a main body portion extending between the pair of connecting portions.

8. The truss foundation according to claim 7, wherein each connecting portion of the pair of connecting portions includes a proximal end portion and a distal end portion, the pair of connecting portions angled apart from one another at a fixed angle of separation with the proximal end portion of each connecting portion projecting away from the main body portion at respective locations at the main body portion below and offset to opposite sides of the bearing.

* * * * *